United States Patent

Aubert

[11] Patent Number: 5,502,267
[45] Date of Patent: Mar. 26, 1996

[54] ORGANIC AND METALLIC WASTE DISPOSAL IN BENTONITE-WATER MIXTURES

[75] Inventor: Winton G. Aubert, Plano, Tex.

[73] Assignee: Atlantic Richfield Company, Los Angeles, Calif.

[21] Appl. No.: 269,455

[22] Filed: Jun. 30, 1994

[51] Int. Cl.⁶ ............................... B09B 1/00; B09B 3/00
[52] U.S. Cl. ............................................. 588/250; 405/128
[58] Field of Search ................ 405/128; 166/305.1, 166/308; 588/250, 256

[56] References Cited

U.S. PATENT DOCUMENTS

| | | | |
|---|---|---|---|
| 4,149,968 | 4/1979 | Kupiec et al. | 405/128 X |
| 4,473,477 | 9/1984 | Beall | 588/259 |
| 4,547,290 | 10/1985 | Pichat | 588/257 |
| 5,109,933 | 5/1992 | Jackson | 405/128 X |
| 5,226,749 | 7/1993 | Perkins | 405/128 |
| 5,314,265 | 5/1994 | Perkins | 405/128 |
| 5,387,737 | 2/1995 | Schmidt et al. | 588/250 |
| 5,405,224 | 4/1995 | Aubert et al. | 405/128 |

*Primary Examiner*—George A. Suchfield
*Attorney, Agent, or Firm*—Michael E. Martin

[57] ABSTRACT

Organic waste such as hydrocarbon waste, refinery sludges, tank bottom sludges, certain wastes from paint, solvent and wax manufacturing and active metals and active metal oxide compositions are disposed of by combining such compositions with bentonite and water to adsorb the waste composition into the bentonite followed by injection of the waste, bentonite and water slurry into a subterranean disposal zone to fix the waste material within disaggregated matrix or created fractures.

13 Claims, No Drawings

ORGANIC AND METALLIC WASTE DISPOSAL IN BENTONITE-WATER MIXTURES

BACKGROUND OF THE INVENTION

1. Field of the Invention

The present invention pertains to a method for disposing of certain organic and metallic waste materials resulting from the production and refining of hydrocarbons by adsorption or ion exchange of these materials onto bentonite particles in a water slurry and the injection of the waste slurry into subterranean earth formations through disposal wells.

2. Background

The continuing need to deal with waste materials resulting from the production and refining of hydrocarbons as well as waste materials which develop through the use of hydrocarbon products has resulted in the development of disposal methods wherein the waste material is injected into a disposal zone in a subterranean earth formation through one or more injection wells, which disposal zone has relatively low in situ stress and, preferably, is bounded by zones which have higher in-situ stresses. In this way the waste materials may be disposed of by fracturing the disposal zone and containing the waste material in the fracture space. In some instances the disposal zone may be capable of a form of fluidization or disaggregation to the extent that the particles of waste material may be commingled with the formation particles to fill the void spaces therebetween.

U.S. patent application Ser. No. 08/234,531 filed Apr. 28, 1994 by Paul A. Fletcher and assigned to the assignee of the present invention, discloses and claims a method of disposing of solids waste materials, including naturally occurring radioactive materials, into a fractured disposal zone of an earth formation by forming the fracture using a fracturing fluid and then lining the fracture faces with a sealant or with a permeability reducing material such as sodium bentonite or a similar clay having superior impermeabilization properties. A waste slurry may then be injected into the fracture to occupy the fracture space between the opposed layers of bentonite "filter cake" which have effectively sealed the fracture faces to substantially prevent the migration of waste material into the matrix of the formation disposal zone.

However, prior disposal methods do not take advantage of an important characteristic of bentonite clay and similar clays, such as montmorillonite, which is the ability of these clays, particularly in an aqueous solution, to readily exchange loosely held cations with many metallic cations. In addition, many organic compounds, including those resulting from the production and refining of hydrocarbon fluids can be adsorbed between the sheetlike molecular structure of bentonite and related clay materials. Accordingly, by mixing bentonite and water with metal and organic waste materials or by adding bentonite to an aqueous solution of such waste materials, these contaminants would be fixed to the adsorbent clay as a further containment factor when the clay slurries are injected into subterranean disposal zones. It is to this end that the present invention has been developed with a view to providing a method for disposing of certain metallic and organic waste materials, particularly those developed as a result of the production and refining of hydrocarbon fluids.

SUMMARY OF THE INVENTION

The present invention provides a method of disposing of metallic and organic waste materials by mixing such materials in a bentonite-water slurry, or a similar clay-water slurry, to take advantage of the ion exchange and adsorptive properties of bentonite and the similar clay materials as an additional fixative mechanism to aid in retaining such waste materials contained within a predetermined earth formation disposal zone.

The present invention contemplates that a bentonite-water mixture wherein sodium bentonite, in particular, is added to water in the amount of 20 pounds per 42 gallon barrel to 30 pounds per 42 gallon barrel (about 8.8 pounds per gallon) may also then receive waste solids or organic fluids in the amount from one pound per gallon to three pounds per gallon and fix such waste materials to the bentonite particles by ionic exchange or adsorption mechanism. This waste mixture may be processed using an apparatus similar to that described in U.S. Pat. No. 5,109,933 issued May 5, 1992 to J. E. Jackson and assigned to the assignee of the present invention, followed by injecting the slurry of water, bentonite and waste material into a disposal zone. Final deposition of the waste slurry may be achieved by disaggregation of the disposal zone or fracturing the disposal zone to provide space for deposition of the waste material.

Still further in accordance with the invention it is contemplated that interaction of waste materials such as active metals and organic materials with the bentonite will remove at least a significant part of the waste materials from solution, thereby rendering them unavailable to be entrained in or dissolved in moving ground water, for example.

Those skilled in the art will further appreciate the above mentioned advantages and superior features of the invention together with other important aspects thereof upon reading the further description which follows.

DESCRIPTION OF A PREFERRED EMBODIMENT

Montmorillonite clay, resulting from the weathering in-situ of volcanic ash, in the form of bentonite displays strong colloidal properties and, when in contact with water, increases its volume several fold by swelling thereby producing a thixotropic, gelatinous substance. The properties of bentonite have made it particularly useful in oil and gas well drilling applications as a component of drilling fluid. The outstanding feature of the montmorillonite constituent of bentonite is that water and other polar molecules, such as certain organic molecules, can enter between the unit layers causing the lattice to expand. This ability of bentonite to hydrate when mixed with water gives rise to desirable drilling fluid properties, such as viscosity and gel strength, which also gives it a solids carrying and suspension capability useful in oil and gas well drilling. Moreover, metallic cations, in aqueous solution, can also readily exchange with the loosely held cations of the bentonite structure. Sodium ($Na^+$) is often the loosely held cation, so bentonite is sometimes referred to as sodium montmorillonite.

The present invention contemplates the preparation of a bentonite-water mixture in the amount of between 20 pounds of bentonite per 42 gallon barrel of water, to 30 pounds of bentonite per 42 gallon barrel of water yielding a density of about 8.8 pounds per gallon. To this mixture is added waste solids in the amount from one pound per gallon to three pounds per gallon and wherein the solids comprise metal oxides, active metals such as lead, mercury, titanium, nickel, copper, zinc, aluminum, magnesium and chromium, for example. Still further, the waste materials may be in the form of refinery sludges, tank bottom sludges and certain paint, solvent and wax manufacturing wastes and similar organic materials which include asphaltenes, benzene, toluene, xylene and trichlorethylene, for example. Alternatively, aqueous solutions of waste materials may have the bentonite added thereto to provide the concentrations indicated above for the disposal slurry.

It is contemplated that organic materials such as those aforementioned will be adsorbed onto the bentonite by attachment of the organic molecule in place of the loosely held sodium cation, for example. Still further, through ion exchange mechanism, the aforementioned metal ions and metal oxide waste materials will also replace sodium aluminum and/or magnesium cations in the bentonite. The bentonite-water mixture, including the adsorbed waste, may then be injected into a subterranean earth formation in a fracture which has been identified as being substantially impermeable and being located in a zone which is, preferably, under in-situ compressive stresses which are lower than stresses prevailing in at least an overburden zone. An added advantage of disposing of waste using a vehicle such as a bentonite- water mixture is that the bentonite particles will tend to plate out on the faces of the fracture thereby further fixing the bentonite and adsorbed waste material in the hydraulic fracture so formed. The fracture process may take place by injecting a bentonite-water mixture ahead of the slurry which includes the waste materials although this may not be necessary if complete adsorption or ion exchange has taken place so that waste material is adhered to the bentonite structure.

One preferred method of disposing of waste in accordance with the present invention may be carried out using a system of the type disclosed in U.S. Pat. No. 5,109,933 issued May 5, 1992 to James E. Jackson and assigned to the assignee of the present invention. U.S. Patent 5,109,933 is incorporated herein by reference. A bentonite-water mixture or slurry is prepared using the system of the '933 Patent by mixing the bentonite and water in one of the tanks of the system. To this mixture is added the waste material in the amount of about one pound to three pounds per gallon of bentonite-water mixture and the slurry of waste material, bentonite and water is thoroughly mixed using the mixing devices of the system of the '933 Patent and/or circulating the mixture through a centrifugal pump such as described in the '933 Patent. The bentonite may be conventional 200 mesh commercial Wyoming sodium bentonite or calcium or sodium bentonites from other sources.

Once the bentonite-water-waste slurry has been thoroughly mixed and the solids reduced in particle size to about 200 microns or less the slurry may be injected into a subterranean earth formation with sufficient pressure to effect fracturing of the formation zone which has been identified as being suitable for disposal. As the slurry of bentonite with the adsorbed wastes and water enters the fracture, if the formation material has some permeability, the liquid will leak off into the formation matrix and the bentonite particles will penetrate slightly into the pores of the matrix or remain substantially at the face of the fracture as a filter cake thereby fixing the adsorbed waste material in the disposal zone. The bentonite solids with the contaminants or waste materials adsorbed thereinto or otherwise attached may also reside in the fracture space if the fracture has been previously lined with uncontaminated bentonite in accordance with the teaching of U.S. patent application Ser. No. 08/234,531. Still further, the interaction of the waste constituents comprising metals and organic compositions with the bentonite wherein these waste constituents are removed from solution renders them unavailable for moving ground water, if any should be present, after the subsurface placement.

Although a preferred embodiment of the present invention has been described in some detail herein those skilled in the art will recognize that various substitutions and modifications may be made to the invention without departing from the scope and spirit of the appended claims.

What is claimed is:

1. A method of disposing of waste material selected from a group consisting of refinery sludges and tank bottom sludges and paint, solvent and wax manufacturing wastes, active metals, metal oxides and hydrocarbon waste comprising the steps of:

preparing a slurry of said waste material, bentonite and water such that said waste material is attached to said bentonite by at least one of adsorption and ion exchange; and injecting said slurry into a subterranean earth formation through a disposal well.

2. The method set forth in claim 1 wherein:

said slurry is prepared by mixing bentonite with water in the amount of between 20 pounds of bentonite per 42 gallon barrel of water and 30 pounds of bentonite per 42 gallon barrel of water and adding waste material to said slurry in an amount of between one pound per gallon and three pounds per gallon and mixing said waste material, bentonite and water to thoroughly disperse said waste material for at least said one of adsorption and ion exchange.

3. The method set forth in claim 1 including the steps of:

passing said slurry through a mixing device to thoroughly mix the components of said slurry and to reduce the particle size of solids in said slurry.

4. The method set forth in claim 3 including the step of:

injecting said slurry into a subterranean earth formation at a pressure sufficient to disperse said slurry into the formation matrix.

5. The method set forth in claim 3 including the steps of:

identifying a disposal zone in said earth formation which is hydraulically fracturable by said slurry; and injecting said slurry into said disposal zone at a pressure sufficient to create a fracture in said disposal zone for deposition of said slurry into said fracture to fix said bentonite and adsorbed waste material in said disposal zone.

6. A method of disposing of waste materials selected from a group consisting of hydrocarbon wastes, refinery sludges and tank bottom sludges and paint, solvent and wax manufacturing wastes, active metals and metal oxides, comprising the steps of:

preparing a slurry of said waste material, water and an adsorbent selected from a group consisting of bentonite, montmorillonite and argillaceous materials having adsorbent and ion exchange properties similar to bentonite and montmorillonite in such a way that said waste material is attached to said adsorbent by at least one of adsorption and ion exchange; and injecting said slurry into a subterranean earth formation.

7. The method set forth in claim 6 including the steps of:

combining said waste material, water and adsorbent such that said adsorbent is present in said slurry in the amount of about 20 pounds per 42 gallon barrel to 30 pounds per 42 gallon barrel of slurry and said waste material is present in said slurry in an amount of between one pound per gallon of slurry and three pounds per gallon of slurry.

8. The method set forth in claim 7 including the step of:

passing said slurry through a mixing device to thoroughly mix the components of said slurry.

9. The method set forth in claim 8 including the step of:

reducing the particle size of solids in said slurry to not more than about 200 microns.

10. The method set forth in claim 6 including the step of:

injecting said slurry into a subterranean earth formation at a pressure and flow rate sufficient to disperse said slurry into the formation matrix.

11. The method set forth in claim 6 including the step of:

injecting said slurry into a disposal zone in said earth formation at a pressure sufficient to create a fracture in said disposal zone for deposition of said slurry in said fracture to fix said adsorbent and adsorbed waste material in said disposal zone.

12. A method of disposing of waste materials selected from a group consisting of hydrocarbon refinery sludges and tank bottom sludges and asphaltenes, benzene, toluene, xylene and trichloroethylene, comprising the steps of:

preparing a slurry of said waste material, water and sodium bentonite in such a way that said waste material is attached to said bentonite by adsorption; and injecting said slurry into a subterranean earth formation.

13. The method set forth in claim 12 including steps of:

combining said waste material, water and bentonite such that said bentonite is present in said slurry in the amount of about 20 pounds per 42 gallon barrel to 30 pounds per 42 gallon barrel of a slurry and said waste material is present in said slurry in an amount of between one pound per gallon of slurry and three pounds per gallon of slurry.

* * * * *